United States Patent
Schulz et al.

(10) Patent No.: US 9,625,983 B2
(45) Date of Patent: Apr. 18, 2017

(54) POWER THROTTLE MECHANISM WITH TEMPERATURE SENSING AND ACTIVITY FEEDBACK

(71) Applicant: ORACLE INTERNATIONAL CORPORATION, Redwood Shores, CA (US)

(72) Inventors: Jurgen M. Schulz, Pleasanton, CA (US); Vishak Chandrasekhar, San Jose, CA (US); Yu-Cheng Chiu, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 259 days.

(21) Appl. No.: 14/336,026

(22) Filed: Jul. 21, 2014

(65) Prior Publication Data

US 2016/0018884 A1 Jan. 21, 2016

(51) Int. Cl.
*G06F 12/08* (2016.01)
*G06F 1/32* (2006.01)

(52) U.S. Cl.
CPC .......... *G06F 1/3296* (2013.01); *G06F 1/3203* (2013.01); *Y02B 60/1217* (2013.01); *Y02B 60/144* (2013.01)

(58) Field of Classification Search
CPC ... G06F 1/3296; G06F 1/3203; Y02B 60/144; Y02B 60/1217
See application file for complete search history.

(56) References Cited

U.S. PATENT DOCUMENTS

| | | | | |
|---|---|---|---|---|
| 6,804,632 B2* | 10/2004 | Orenstien | ............... | G06F 1/206 702/182 |
| 2008/0040562 A1* | 2/2008 | Gower | ..................... | G06F 1/206 711/154 |
| 2012/0079290 A1* | 3/2012 | Kumar | ...................... | G06F 1/26 713/300 |
| 2012/0173906 A1* | 7/2012 | Elnozahy | .............. | G06F 1/3203 713/320 |
| 2013/0185570 A1* | 7/2013 | Kumar | ...................... | G06F 1/26 713/300 |
| 2014/0195829 A1* | 7/2014 | Bhandaru | ................. | G06F 1/26 713/300 |
| 2016/0103474 A1* | 4/2016 | Kumar | ...................... | G06F 1/26 713/300 |

\* cited by examiner

*Primary Examiner* — M Elamin

(57) ABSTRACT

Integrated circuit devices, methods, and other embodiments associated with power throttling with temperature sensing and activity feedback are described. In one embodiment, an integrated circuit device includes temperature sensing logic, activity sensing logic, comparison logic, and signal logic. The temperature sensing logic is configured to output a temperature signal indicative of a temperature of a selected region of the device. The activity sensing logic is configured to output an activity signal indicative of a level of activity of a selected device function. The mode selection logic is configured to select the temperature signal or the activity signal. The comparison logic is configured to compare the selected signal to a series of threshold levels and output a comparison result. The signal logic is configured to generate a throttle signal based on the comparison result. The throttle signal is used to control a frequency of operation of a selected device component.

20 Claims, 6 Drawing Sheets

POWER THROTTLE MECHANISM WITH TEMPERATURE SENSING AND ACTIVITY FEEDBACK

BACKGROUND

Throttling is a technique whereby the frequency of an integrated circuit can be automatically adjusted either to conserve power or to reduce the amount of heat generated by the microprocessor and its associated components. Reducing the frequency of a microprocessor through throttling decreases the number of operations being performed by the microprocessor, thereby decreasing the microprocessor's energy consumption and heat production. Throttling is used in enterprise systems to control energy consumption, which may be subject to limits due to environmental concerns or electricity provider constraints, and to reduce heating in the area surrounding the enterprise system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

It is advantageous to include a throttling mechanism in an integrated circuit device so that power consumption and/or heating generated by the device can be limited. However, if the device can be used in a number of applications by a diverse clientele, a single throttling technique may not be suited for all of the applications. Further, when an integrated circuit is a component of a complex computing system, such as an enterprise system, it may be difficult to predict which throttling technique will be optimal for the integrated circuit as it interacts with other components in the system.

Systems, devices, and methods are described herein that improve flexibility in throttle design by providing a power throttling mechanism with both temperature sensing and activity feedback. In addition to allowing selection between throttling based on temperature or a selected device function activity level, in one embodiment, fine grained control of threshold levels and a throttling profile is provided through programmable look up tables.

Figure 1:
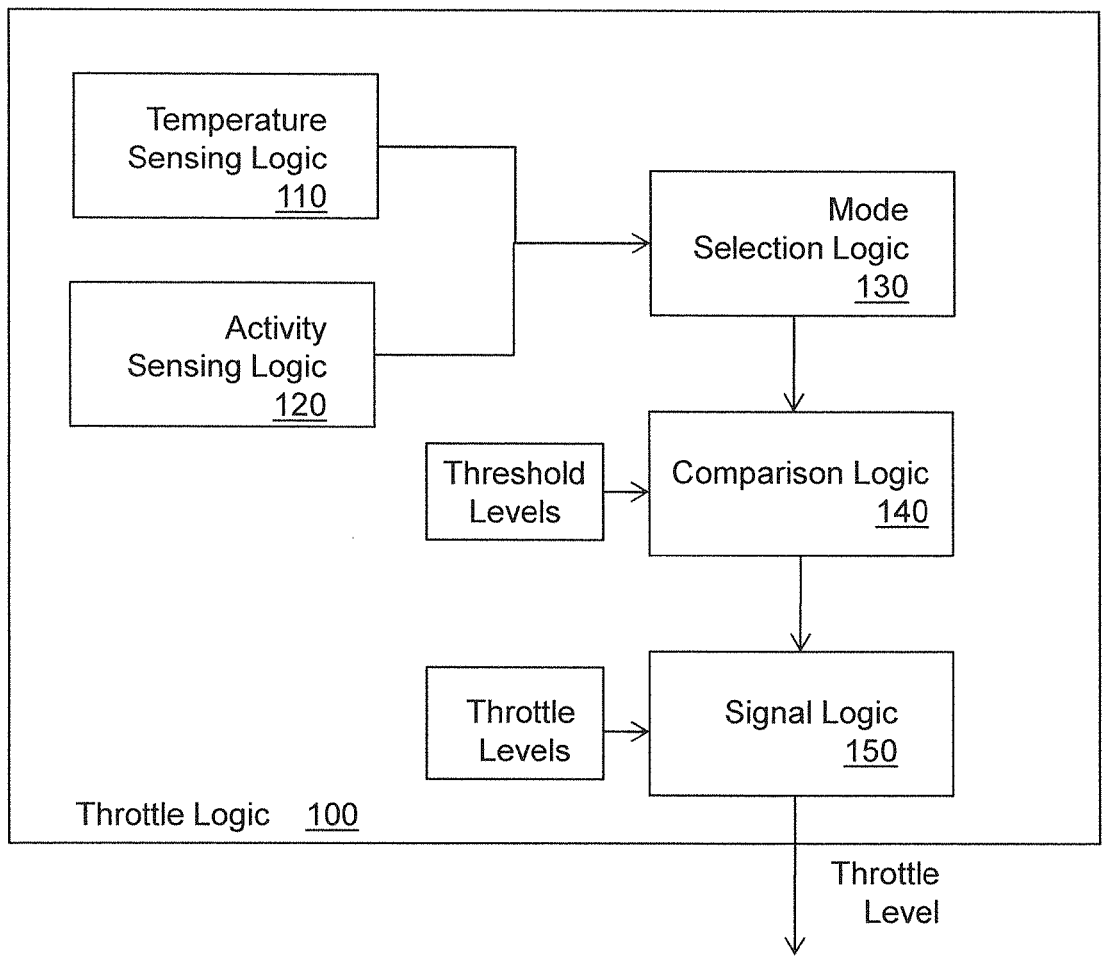
FIG. 1 illustrates one embodiment of a system that includes a power throttle mechanism with temperature sensing and activity feedback.

FIG. 1 illustrates one embodiment of a throttling logic 100 that provides a throttling mechanism with temperature sensing and activity level feedback. The throttling logic 100 may be included in an integrated circuit device (not shown, see FIG. 6) to provide flexible, programmable throttling for the integrated circuit. The throttle logic produces a throttle signal that is provided to control the frequency of operation of a selected device component (not shown) based, at least in part, on the throttle signal. In one embodiment, the throttle signal is a pulse width modulated (PWM) signal having a pulse width that defines a proportion of clock cycles (e.g., a number x out of every 64 clock cycles) during which the selected device component does not perform operations.

The throttle logic 100 includes temperature sensing logic 110, activity sensing logic 120, mode selection logic 130, comparison logic 140, and signal logic 150. The temperature sensing logic 110 is configured to output a temperature signal indicative of a temperature of a selected region of the integrated circuit device. In one embodiment, described in further detail with respect to FIG. 2, the temperature signal is selected from among several signals from sensors placed in various locations on the device.

The activity sensing logic 120 is configured to output an activity signal indicative of a level of activity of a selected device function. For the purposes of this description, the phrase "signal indicative of a level of activity of a selected device function" refers in a broad sense to any signal that communicates how often a certain function is being performed by the device. Device functions that are found to be closely correlated to dynamic power consumption are suitable for monitoring to produce the activity signal. Example functions that may be monitored for throttling purposes include read operations or write operations on memory, activity of pipeline enable signals, and so on. In this description, the phrase "activity indicator signal" is used to describe a signal that indicates an occurrence of the monitored function (e.g., read operation). In one embodiment, a counter may count each read operation and this count, or an average of counts over some window of time, is the resulting activity signal.

In many applications, the integrated circuit device includes hardware configured to execute a plurality of instances of the selected device function in parallel. For example, the device may include multiple core processors that are all reading a common memory in parallel. In this embodiment, the activity sensing logic 120 is configured to input a plurality of activity indicator signals corresponding to respective instances of the selected device function (e.g., read operations) performed by groups of hardware. The activity sensing logic 120 is configured to select one or more of the activity indicator signals and generate the activity signal based, at least in part on the selected one or more activity indicator signals. In one embodiment, the activity sensing logic 120 is configured to generate the activity signal by averaging the selected one or more activity indicator signals over a selected window of time/clock pulses.

The mode selection logic 130 is configured to select either the temperature signal or the activity signal for throttling purposes. In one embodiment, the mode selection logic 130 is programmable, via a control and status register, to select either temperature or activity level to control throttling. In this manner, once information about power consumption and/or heating effects are known about a particular application of the device, an appropriate throttling mode can be selected, and easily changed later if necessary.

The comparison logic 140 is configured to compare the selected signal to a series of threshold levels and output a comparison signal. The comparison result indicates a highest threshold level in the series of threshold levels that is met or exceeded by the selected signal. Using a series of threshold levels rather than a single threshold level allows for finer grained throttle control. In one embodiment, the series has 32 threshold levels. The series of threshold levels can describe any trajectory and does not need to be linear or follow any particular curve. The threshold levels can be programmable and in one embodiment, the threshold levels are stored in a control and status register look up table that is programmable, thus providing flexibility in tailoring the throttling thresholds to a particular application.

The signal logic 150 is configured to generate the throttle signal based, at least in part, on the comparison signal. In one embodiment, the signal logic 150 is configured to access a lookup table that maps comparison signal values to respective throttle levels and to generate the throttle signal, based at least in part, on the throttle level mapped to the comparison signal value. Using multiple throttle levels rather than a single throttle value allows for finer grained throttle control. In one embodiment, the lookup table stores 32 throttle level values. The throttle level values can be stored in a control and status register look up table that is programmable, thus providing flexibility in tailoring the throttle level values to a particular application.

In an enterprise system context, the device that incorporates the throttle logic 100 may be an enterprise system scalability Application Specific Integrated Circuit (ASIC) that controls access to data in cache memory shared by multiple microprocessors. The ASIC includes a cache directory that controls access to a multi-level shared cache. In this particular embodiment, one device function that is suitable for monitoring to produce the activity signal is a cache tag directory static Random Access Memory (SRAM) read enable operation. One device that is suitable for control by the throttle signal is an address serialization unit (ASU) that controls a flow of requested memory addresses to the cache tag directory.

Figure 2:
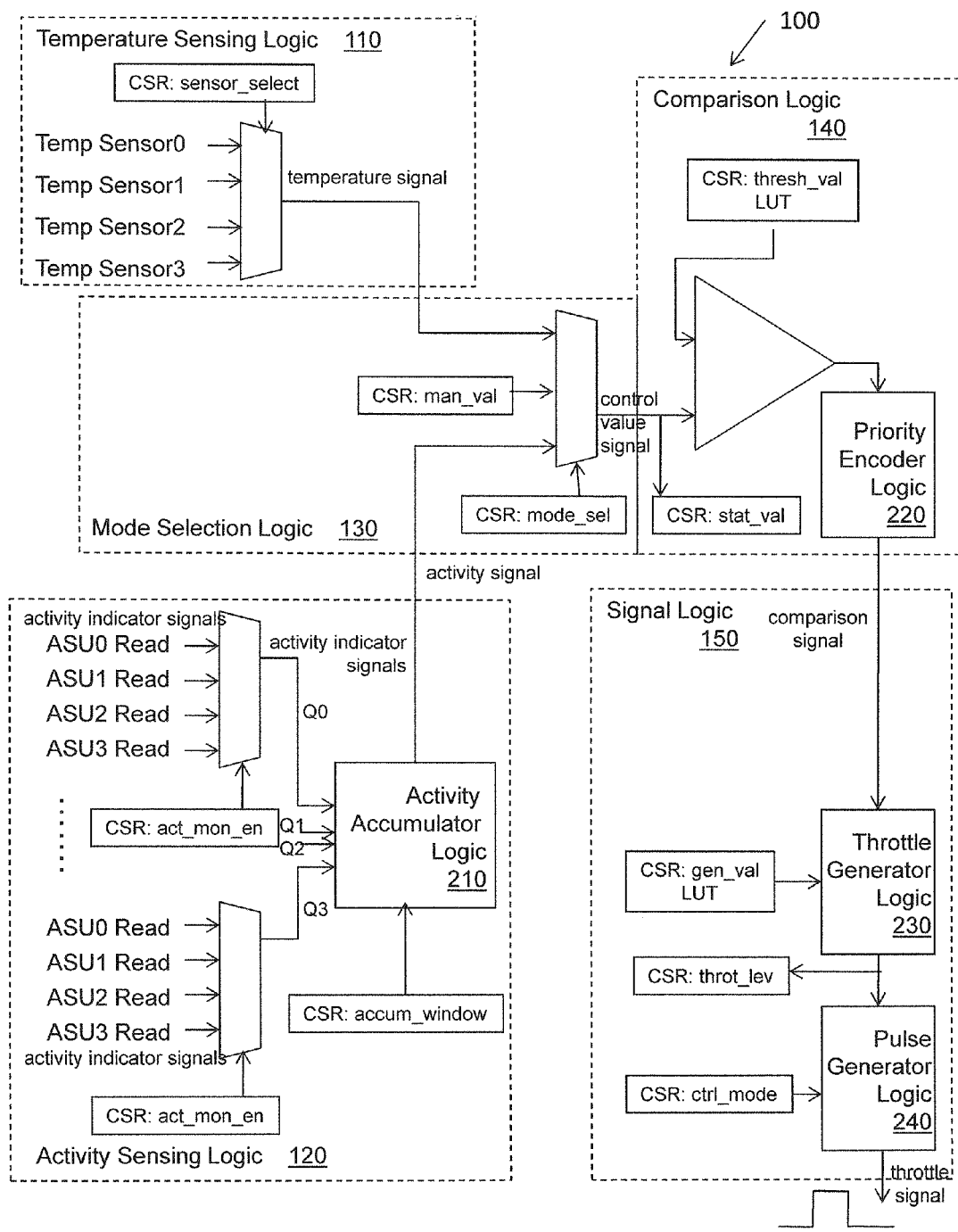
FIG. 2 illustrates another embodiment of the system of FIG. 1.

FIG. 2 illustrates one example embodiment of the throttle logic 100 as implemented in a scalability ASIC. The temperature sensing logic 110 inputs digital temperature values from four temperature cells or sensors placed at different points in the device. The location of the sensors depends on the physical floorplan of the device and expected hotspots on the device. In one embodiment, the sensors output a 12 bit digital value that represents the temperature in Celsius based on the following equation:

Temp(Celsius)=$k_2$(code)$^2$+$k_1$code+$k_0$

Where k2, k1, k0 are determined from silicon characterization results.

One of the four temperature readings is selected by a multiplexer controlled by a sensor select value. In one embodiment, the sensor select value is stored in a programmable control and status register. The selected value is converted to 14 bits by zero filling the most significant bits of the reading to produce the temperature signal.

The activity sensing logic 120 inputs an activity indicator signal that indicates occurrence of each cache tag directory static Random Access Memory (SRAM) read enable operations from 16 address serialization units (ASUs). To produce each signal, the directory tag read enables for two neighboring CPU columns (belonging to a same shared memory processor) are ORed together to form a 16 bit activity indicator signal. The ASUs are divided into quadrants, and signals from each of the four ASUs in a quadrant are input to respective multiplexers that each select a signal from one of the four ASUs based on an activity monitoring enable value. In one embodiment, the activity monitoring enable value is stored in a programmable control and status register.

The resulting 64 bit vector (16 bit activity indicator signals from each of the four quadrants) is input to an activity accumulator logic 210 that calculates an average activity level during an accumulation window and outputs a 14 bit activity signal that represents the average activity level. In one embodiment, the size of the accumulation window is controlled by an accumulation window value stored in a programmable control and status register.

Figure 3:
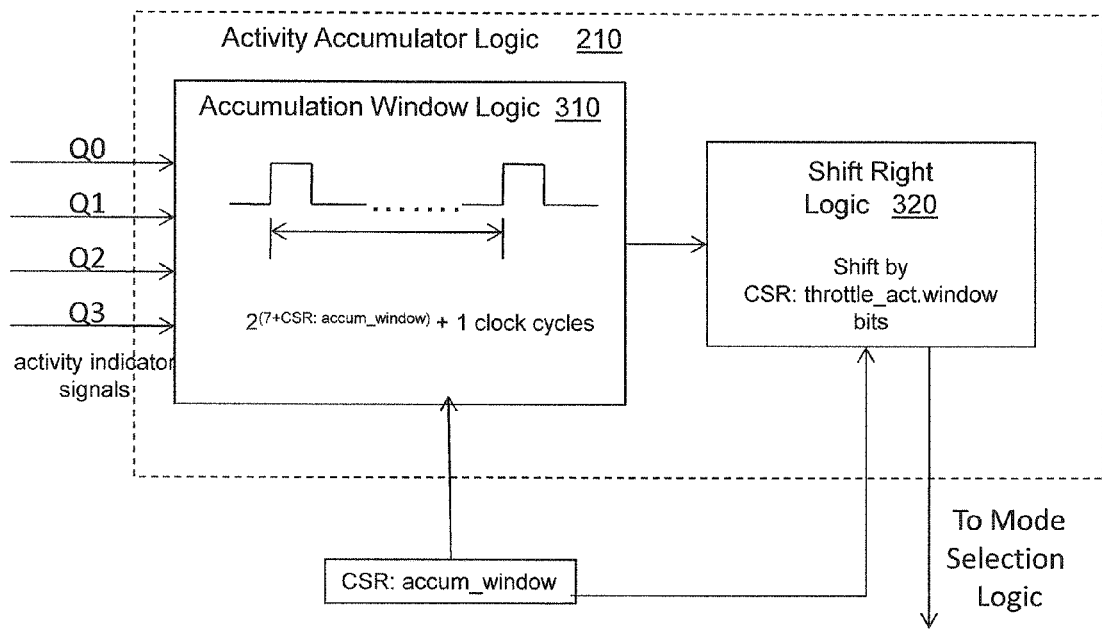
FIG. 3 illustrates one embodiment of the activity accumulator logic of FIG. 2.

FIG. 3 illustrates one example embodiment of the activity accumulator logic 210. The activity accumulator logic 210 includes an accumulation window logic 310 that counts signals indicative of read enables in the 64 bit vector resulting from the combination of outputs from the selected ASUs. The accumulation window logic 310 counts signals for a period having a duration of $2^{(7+accum\_window\ value)}+1$ clock cycles. Thus, the duration of the window is controlled by the accumulator window value. The accumulation window logic 310 outputs the count value to a shift right logic 320 that shifts the count right by a number of bits to perform an averaging operation on the count. The average is output as the activity signal. The number of bits the count is shifted is controlled by the value of throttle_act.window which may be stored in a programmable control and status register. For example, if the value of throttle_act.window is three, an average taken over three windows will be output as the activity signal. By adjusting the values of accumulator window and throttle_act.window, the sensitivity of the activity signal can be calibrated.

Returning to FIG. 2, the mode selection logic 130 inputs the temperature signal and the activity signal to a multiplexer that is controlled by a mode select value. The mode select value controls the multiplexer to select between a temperature throttling mode in which the temperature signal is output as the control value signal, an activity throttling mode in which the activity signal is output as the control value signal, or a manual mode in which a manual value (man_val) is output by the multiplexer as the control value signal. The manual value is stored in a programmable control and status register and can be used during debugging to manually set a control value signal.

A present value of the control value signal is input to the comparison logic 140. In one embodiment, the present value of the control value signal is stored in a control and status register (e.g., stat_val in FIG. 2). The comparison logic compares the control value signal value to a series of 32 preset 14 bit threshold levels. In one embodiment, the threshold levels are programmable via a control and status register look up table (e.g., thresh_val). The result of the comparison is a 32 bit vector, with each bit indicating whether the control value signal value is greater than or equal to the threshold level corresponding to that bit. The 32 bit vector is input to a priority encoder logic 220, which outputs a 5 bit comparison signal indicating the highest threshold level that was met or exceeded by the control value signal value.

The signal logic 150 includes a throttle generator logic 230 that accesses a throttle level (gen_val in FIG. 2) lookup table that maps the highest throttle level to respective throttle levels. The throttle level look up table maps 32 different 5 bit comparison signal values to an amount of throttling prescribed for the comparison signal value. The comparison result signal is used to index into an array of control and status registers that constitutes the look up table to select an appropriate 5 bit (e.g., 0-31) throttle level. In this manner, different levels of sensitivity to the comparison signal value can be obtained. The throttle generator logic 230 outputs the throttle level that is mapped to the comparison signal value. In one embodiment, the throttle generator logic 230 stores the throttle level in a control and status register for access by a pulse generator logic 240.

The pulse generator logic 240 shifts the throttle level by one bit and generates a pulse that is between 0 and 62 clock cycles wide, in increments of 2 clock cycles. A width of 0 will result in no throttling. A width of 62 will result in the maximum possible throttling. The pulse generator logic 240 outputs the pulse as the throttle signal. In one embodiment, the pulse generator logic 240 samples the throttle level every 64 clock cycles. This provides a minimum hysteresis and minimum flow of requested memory addresses through the ASUs even under maximum throttling conditions. The throttle signal is sent in a daisy chained fashion to the ASUs to throttle requested memory addresses presented to the cache tag directory. The daisy chaining causes the ASUs to see the throttling pulse at slightly different times.

Figure 4:
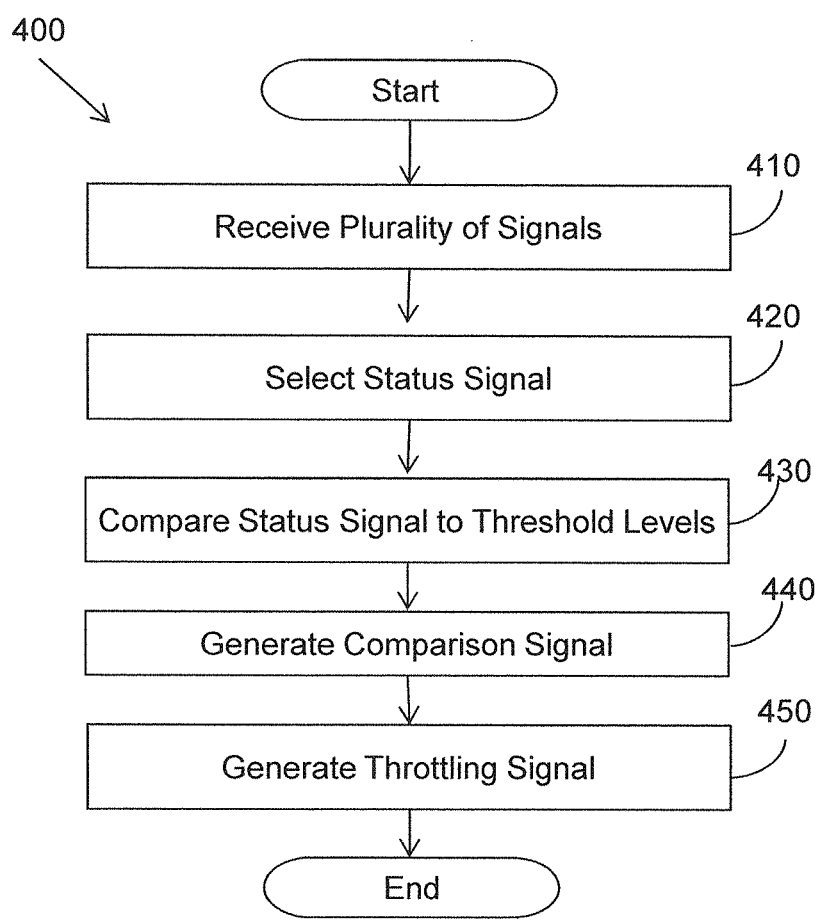
FIG. 4 illustrates one embodiment of a method of generating a throttle signal based on a sensed temperature or activity feedback.

FIG. 4 illustrates one example embodiment of method 400 of throttling with temperature sensing and activity feedback. The method includes, at 410, receiving a plurality of signals indicative of respective operating parameters of an integrated circuit device. Example operating parameters include a temperature of the device and/or an activity level of a selected device function. In embodiment, the signals include an activity signal. To generate the activity signal, a plurality of activity indicator signals indicative of a level of activity of respective instances of a selected device function (e.g., read operations performed by independent microprocessors on SRAM) are averaged over a selected time window.

At 420, a control value signal is selected from among the plurality of signals. During device testing or setup, experimentation can be made to determine which of the signals best correlates to dynamic power consumption of the integrated circuit device and the signal that best correlates can be selected as the control value signal. In one embodiment, the control value signal is selected based, at least in part, on an intended application of the integrated circuit device.

At 430, a present control value signal value is compared to a series of threshold levels. In one embodiment, the series of threshold levels is programmable by way of an array of control and status registers that form a lookup table. In one embodiment, the series of threshold levels includes 32 values, which provides a fine granularity in specifying the threshold levels. The method includes, at 440, generating a comparison signal indicative of a highest threshold level that is met or exceeded by the control value signal. In one embodiment, the comparison is made by accessing a look up table that stores the series of threshold levels.

At 450, the method includes generating a throttle signal, based at least in part, on the comparison signal. In one embodiment, the method includes generating the throttle signal by accessing a lookup table that maps comparison signal values to respective throttle levels, selecting a throttle level mapped to the comparison signal value, and generating the throttle signal, based at least in part, on the selected throttle level. In one embodiment, the throttle signal is a PWM signal that has a pulse width that is proportional to a prescribed amount of throttling.

Figure 5:
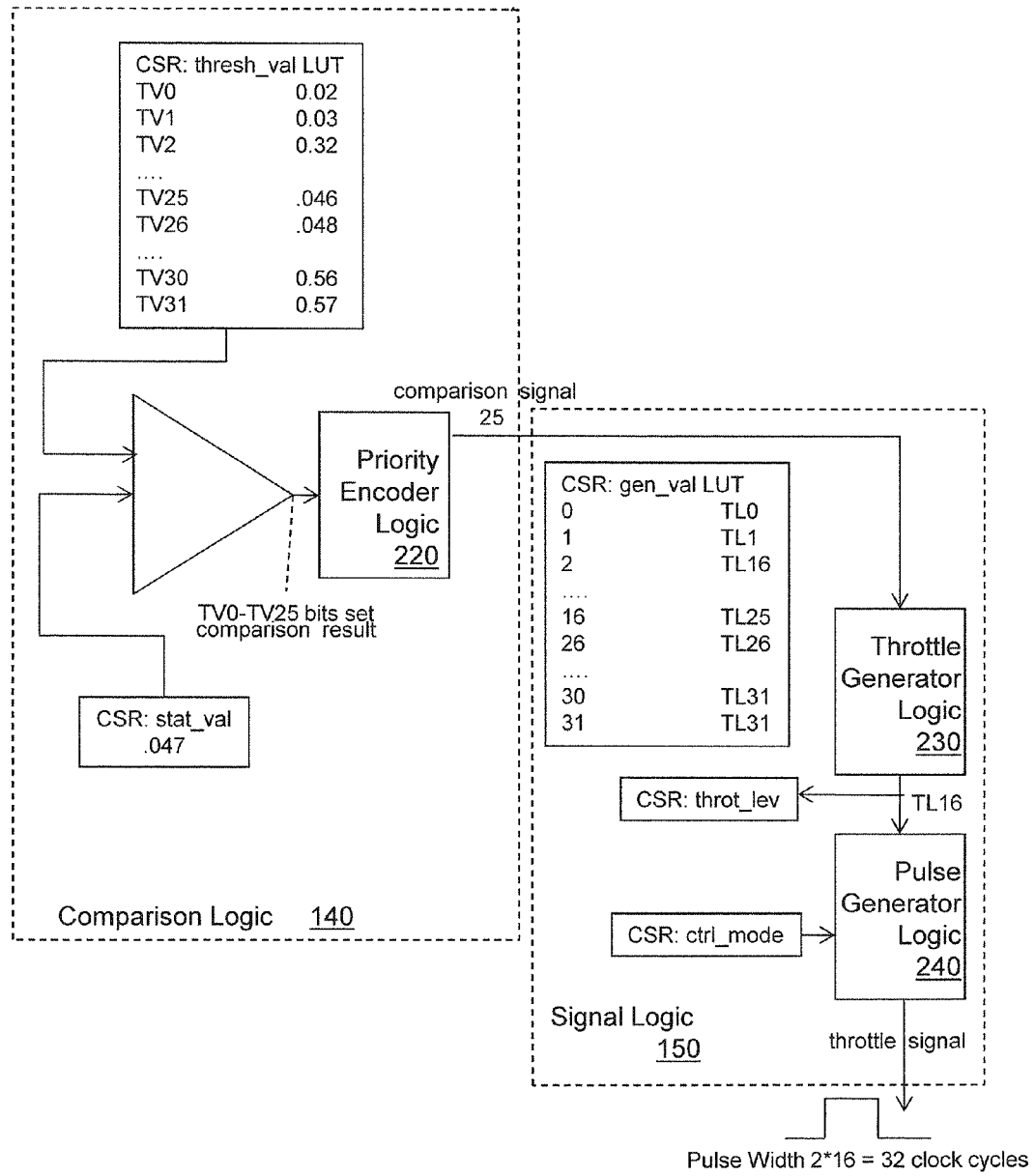
FIG. 5 illustrates an example outlining operation of the system of FIG. 2.

FIG. 5 illustrates an example of how threshold levels and throttle level values can be stored in look up tables in one embodiment. A threshold level lookup table (thresh_val) is programmed with a series of 32 threshold levels TV0-TV31. In the illustrated example, the threshold levels TV0-TV31 are mapped to control value signal values 0.02-0.57, respectively. In one embodiment, the threshold levels range from $0\text{-}2^{-14}$. The series of 32 threshold level values can follow any progression, capturing a detailed threshold profile.

A throttle level look up table (gen_val) maps the 32 threshold levels to 32 throttling levels. As with the threshold level look up table, the throttle level look up table is programmable and throttle level values can follow any progression, capturing a detailed throttling profile. The programmable threshold level table and throttle level table provide great flexibility in prescribing varying amounts of throttling depending on the control value signal.

To specify the throttle signal, the comparison logic 140 compares a present control value signal value (e.g., 0.47) stored in a control and status register with the threshold levels stored in the look up table. In the example, the control value signal value 0.47 meets or exceeds threshold levels TV0-TV25. The result of the comparison is a 32 bit value in which bits 0-25 are set. This comparison result is input to the priority encoder logic 220 which converts the 32 bit value into a 5 bit comparison signal that is indicative of the threshold level 25. The comparison signal is input to the throttle generator logic 230. The throttle generator logic 230 accesses the throttle level look up table and determines that a throttle level of 16 is mapped to the threshold level 25. The throttle level 16 is stored in a control register that is accessible to the pulse generator logic 240. The pulse generator logic generates a pulse that has a pulse width of 2(16) or 32 clock cycles. Thus, out of every 64 clock cycles, the clock signal to the selected device will be suppressed for 32 cycles. The pulse generator 240 accesses the control and status register that stores the throttle level periodically to adjust the throttle signal as necessary.

Figure 6:
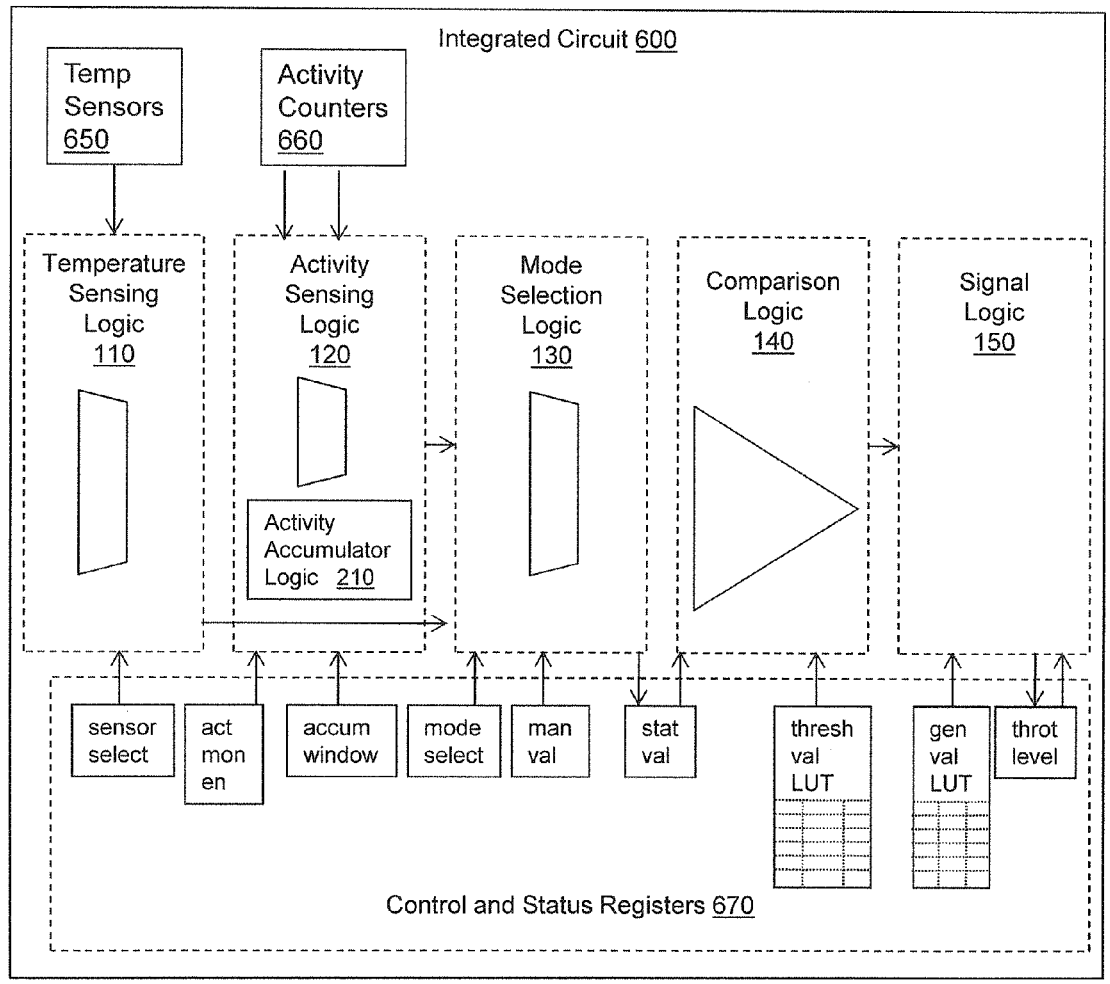
FIG. 6 illustrates an embodiment of an integrated circuit device that provides a power throttle mechanism with temperature sensing and activity feedback.

FIG. 6 illustrates one example embodiment of an integrated circuit device 600 that includes a throttling mechanism with temperature and activity feedback. The integrated circuit device 600 includes a set of control and status registers 670 that are capable of being programmed with various values referenced below. The integrated circuit device 600 includes one or more temperature sensors 650 that provide temperature signals indicative of temperatures of respective regions of the integrated circuit device to the temperature sensing logic 110.

The temperature sensing logic 110 includes a multiplexer configured to input a sensor select value and the plurality of temperature signals and select one of the plurality of temperature signals based, at least in part on the sensor select value. The temperature sensing logic 110 outputs the selected temperature signal to the mode selection logic 130.

The integrated circuit device 600 includes activity counters 660 that each count instances of a selected device function performed by a selected group of hardware components (e.g., a set of four ASUs) and outputs an activity indicator that is indicative of the level of activity of the selected device function. In one embodiment, the activity counters count read operations by ASUs on SRAM in a cache tag directory. The activity sensing logic 120 includes a multiplexer configured to input an activity monitoring enable value and the activity indicator signals output by the activity counters. The multiplexer selects one of the plurality of activity indicator signals based, at least in part, on the activity monitoring enable value. The activity accumulator logic 210 averages the selected activity indicator signal over a selected time window to generate the activity signal. The width of the selected time window is defined by an accumulation window value. The activity sensing logic 120 outputs the activity signal to the mode selection logic 130.

The mode selection logic 130 includes a multiplexer configured to input a mode select value, a manually input value, the activity signal, and the temperature signal. The multiplexer selects either the manually input value, the temperature signal or the activity signal based, at least in part, on the mode select value and outputs a control value corresponding to a present value of the selected one of the temperature signal or the activity signal. In one embodiment, the control value is stored in a control and status register 670 for access by the comparison logic 140.

The comparison logic 140 is configured to input a series of threshold level values and the control value. In one embodiment, the series of threshold level values is stored in a look up table comprising an array of control and status registers 670. The comparison logic 140 compares the control value to the series of threshold level values and outputs a comparison signal indicative of a highest threshold level that is met or exceeded by the control value.

The signal logic 150 is configured to input the comparison signal and access a throttle level look up table (e.g., gen_val) that maps comparison signal values to throttle levels. The signal logic 150 select a throttle level value mapped to a value of the comparison signal and generates a throttle signal based, at least in part, on the selected throttle level value. The throttle signal is transmitted to an integrated circuit device component that controls a frequency of operation of a selected device component based, at least in part, on the throttle signal. In one embodiment, the selected device component is an ASU whose read operations are monitored by the activity counter. In another embodiment, the selected device component is different from the device whose activity is monitored to generate the activity signal.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. An integrated circuit device, comprising:
   a temperature sensing circuit configured to output a temperature signal indicative of a temperature of a selected region of the integrated circuit device;
   an activity sensing circuit configured to output an activity signal indicative of a level of activity of a selected device function;
   a mode selection circuit connected to at least the temperature sensing circuit and the activity sensing circuit, wherein the mode selection circuit is configured to select either the temperature signal or the activity signal;
   a comparison circuit configured to compare the selected signal to a series of threshold levels and output a comparison signal; and
   a signal circuit configured to generate a throttle signal based, at least in part, on the comparison signal, wherein the throttle signal is transmitted to an integrated circuit device component that controls a frequency of operation of a selected device component based, at least in part, on the throttle signal.

2. The device of claim 1, wherein the selected device function comprises cache tag Random Access Memory (RAM) read enable operations.

3. The device of claim 1, wherein the selected device component comprises an address serialization unit (ASU) that controls a flow of requested memory addresses to a cache tag directory.

4. The device of claim 1, wherein the temperature circuit is configured to input a plurality of temperatures sensed in respective locations on the integrated circuit device and to output, as the temperature signal, a selected one of the temperatures.

5. The device of claim 1, wherein:
   the integrated circuit device comprises hardware configured to execute a plurality of instances of the selected device function in parallel; and
   the activity sensing circuit is configured to:
      input a plurality of activity indicator signals corresponding to respective instances of the selected device function;
      select one or more of the activity indicator signals; and
      generate the activity signal based, at least in part on the selected one or more activity indicator signals.

6. The device of claim 5, wherein the activity sensing circuit is configured to generate the activity signal by averaging the selected one or more activity indicator signals over a selected time window.

7. The device of claim 1, further comprising an array of control and status registers configured to store a lookup table that maps comparison signal values to respective throttle levels, wherein the signal circuit accesses the lookup table to select a throttle level and generates the throttle signal, based at least in part, on the selected throttle level.

8. A method, comprising:
   receiving, by at least one circuit, a plurality of signals indicative of respective operating parameters of an integrated circuit device;
   selecting, by the at least one circuit, a control value signal from among the plurality of signals that correlates to dynamic power consumption of the integrated circuit device;
   comparing, by the at least one circuit, a present control value signal value to a series of threshold levels;
   generating, by the at least one circuit, a comparison signal indicative of a highest threshold level that is met or exceeded by the control value signal; and
   generating, by the at least one circuit, a throttle signal, based at least in part, on the comparison signal.

9. The method of claim 8, comprising selecting, by the at least one circuit, the control value signal based, at least in part, on an intended application of the integrated circuit device.

10. The method of claim 8, wherein the comparing comprises accessing, by the at least one circuit, a lookup table that stores the series of threshold levels.

11. The method of claim 8, wherein the plurality of signals comprise a plurality of activity indicator signals indicative of a level of activity of respective instances of a selected device function.

12. The method of claim 11, comprising generating, by the at least one circuit, the control value signal by:
   inputting the plurality of activity indicator signals; and
   averaging a selected one or more activity indicator signals over a selected time window.

13. The method of claim 8, wherein the plurality of signals further comprise temperature signals indicative of temperatures of respective regions of the integrated circuit device.

14. The method of claim 8, wherein generating, by the at least one circuit, the throttle signal comprises:
   accessing a lookup table that maps comparison signal values to respective throttle levels;
   selecting a throttle level mapped to the comparison signal value; and
   generating the throttle signal, based at least in part, on the selected throttle level.

15. An integrated circuit device, comprising:
   a mode selection circuit comprising a multiplexer configured to:
      input a mode select value, an activity signal, and a temperature signal;
      select either the temperature signal or the activity signal based, at least in part, on the mode select value; and
      output a control value corresponding to a present value of the selected one of the temperature signal or the activity signal;
   a comparison circuit configured to:
      receive as input a series of threshold levels and the control value;
      compare the control value to the series of threshold levels; and
      output a comparison signal indicative of a highest threshold level that is met or exceeded by the control value; and
   a signal circuit configured to
      receive as input the comparison signal;
      access a mapping of comparison signal values to throttle levels;
      select a throttle level value mapped to a value of the comparison signal;
      generate a throttle signal value based, at least in part, on the selected throttle level value; and
      transmit the throttle signal to an integrated circuit device component that controls a frequency of operation of a selected device component based, at least in part, on the throttle signal.

16. The device of claim 15, further comprising an activity sensing circuit comprising a multiplexer configured to:

receive as input an activity monitoring enable value and a plurality of activity indicator signals indicative of a level of activity of respective instances of a selected device function;

select one of the plurality of activity indicator signals based, at least in part, on the activity monitoring enable value; and average a selected activity indicator signal over a selected time window;

output an average as the activity signal.

17. The device of claim 16, further comprising a temperature sensing circuit comprising a multiplexer configured to:

receive as input a sensor select value and a plurality of temperature signals indicative of temperatures of respective regions of the integrated circuit device;

select one of the plurality of temperature signals based, at least in part on the sensor select value; and output the selected temperature signal.

18. The device of claim 16, wherein the selected device component performs the selected device function.

19. The device of claim 16, wherein:

the integrated circuit device comprises a scalability Application Specific Integrated Circuit (ASIC) that controls access to data in cache memory shared by multiple microprocessors;

the selected device function comprises cache tag Random Access Memory (RAM) read enable operations; and the selected device component comprises an address serialization unit (ASU) that controls a flow of requested memory addresses to a cache tag directory.

20. The device of claim 15, further comprising a set of programmable control and status registers configured to store one or more of: a sensor select value, an activity monitoring enable value, an accumulator window value, the mode select value, the control value, a first lookup table storing the series of threshold levels, a second lookup table that maps comparison signal values to throttle levels, and the throttle level value.

* * * * *